(12) United States Patent
Polland et al.

(10) Patent No.: US 11,126,239 B2
(45) Date of Patent: Sep. 21, 2021

(54) SYSTEMS AND METHODS FOR NETWORK PORT OCCUPANCY STATE CHANGE MONITORING USING LOW ENERGY WIRELESS COMMUNICATIONS

(71) Applicant: CommScope Technologies LLC, Hickory, NC (US)

(72) Inventors: Joseph Polland, Eden Prairie, MN (US); Joseph C. Coffey, Burnsville, MN (US)

(73) Assignee: CommScope Technologies LLC, Hickory, NC (US)

( * ) Notice: Subject to any disclaimer, the term of this patent is extended or adjusted under 35 U.S.C. 154(b) by 360 days.

(21) Appl. No.: 16/269,479

(22) Filed: Feb. 6, 2019

(65) Prior Publication Data

US 2019/0286211 A1    Sep. 19, 2019

Related U.S. Application Data

(60) Provisional application No. 62/642,454, filed on Mar. 13, 2018.

(51) Int. Cl.
| | |
|---|---|
| *G06F 1/3206* | (2019.01) |
| *H04W 4/80* | (2018.01) |
| *H04L 12/26* | (2006.01) |
| *H04Q 1/02* | (2006.01) |
| *H04Q 9/00* | (2006.01) |

(52) U.S. Cl.
CPC ........ *G06F 1/3206* (2013.01); *H04L 43/0811* (2013.01); *H04L 43/0817* (2013.01);
(Continued)

(58) Field of Classification Search
CPC ........ G06F 1/3206; G06F 1/32; G06F 1/3231; G06F 1/3215; G06F 1/3203;
(Continued)

(56) References Cited

U.S. PATENT DOCUMENTS

| | | | | |
|---|---|---|---|---|
| 2004/0257225 A1* | 12/2004 | Webb, Sr. | .......... | G08B 13/2462 340/539.26 |
| 2008/0049627 A1* | 2/2008 | Nordin | .................... | H04L 41/12 370/241 |
| 2010/0141379 A1* | 6/2010 | Tucker | .................. | H04Q 1/136 340/3.1 |

(Continued)

FOREIGN PATENT DOCUMENTS

| | | |
|---|---|---|
| WO | 2018009601 A1 | 1/2018 |
| WO | 2019006026 A1 | 1/2019 |

OTHER PUBLICATIONS

European Patent Office, "Communication pursuant to Article 94(3) from EP Application No. 19162431.1", from Foreign Counterpart to U.S. Appl. No. 16/269,479, filed Aug. 17, 2020, pp. 1 through 7, Published: EP.

(Continued)

*Primary Examiner* — Raymond N Phan
(74) *Attorney, Agent, or Firm* — Fogg & Powers LLC

(57) ABSTRACT

Systems and methods for network port monitoring using low energy wireless communications are provided. In one embodiment, a device comprises: at least one port module, the at least one port module comprising one or more connector ports each configured to receive a connector of a network data cable; and a port state sensor that includes a port sensing circuit coupled to a sensor controller, wherein the port sensing circuit is configured to sense a port state for the one or more connector ports; wherein the sensor controller is configured to input the port state from the port sensing circuit, wherein in response to detecting a change in the port state from the port sensing circuit, the sensor controller wirelessly transmits port state information to a port state monitor.

28 Claims, 9 Drawing Sheets

(52) U.S. Cl.
CPC .............. *H04L 43/10* (2013.01); *H04L 43/16* (2013.01); *H04Q 1/03* (2013.01); *H04Q 1/136* (2013.01); *H04Q 1/138* (2013.01); *H04Q 9/00* (2013.01); *H04W 4/80* (2018.02); *H04Q 2209/43* (2013.01); *H04Q 2209/883* (2013.01)

(58) Field of Classification Search
CPC ........ G06F 1/3296; G06F 1/26; G06F 1/3234; H04Q 1/138; H04Q 1/136; H04Q 2209/883
See application file for complete search history.

(56) References Cited

U.S. PATENT DOCUMENTS

| | | | |
|---|---|---|---|
| 2012/0198246 A1* | 8/2012 | German | H04Q 1/136 |
| | | | 713/300 |
| 2014/0111346 A1 | 4/2014 | Pinn et al. | |
| 2014/0253093 A1* | 9/2014 | Bermudez Rodriguez | ........... |
| | | | G06Q 10/087 |
| | | | 324/76.11 |
| 2016/0132532 A1* | 5/2016 | German | G06K 9/00671 |
| | | | 382/103 |
| 2017/0236406 A1* | 8/2017 | Anderson | G08B 13/08 |
| | | | 340/501 |

OTHER PUBLICATIONS

European Patent Office, "Extended European Search Report from EP Application No. 19162431.1 dated May 24, 2019", from Foreign Counterpart to U.S. Appl. No. 16/269,479, pp. 1-9, Published: EP.

* cited by examiner

SYSTEMS AND METHODS FOR NETWORK PORT OCCUPANCY STATE CHANGE MONITORING USING LOW ENERGY WIRELESS COMMUNICATIONS

CROSS-REFERENCE TO RELATED APPLICATIONS

This U.S. Patent Application claims priority to, and the benefit of, U.S. Provisional Patent Application No. 62/642,454 titled "SYSTEMS AND METHODS FOR NETWORK PORT MONITORING USING LOW ENERGY WIRELESS COMMUNICATIONS" filed on Mar. 13, 2018, which is incorporated herein by reference in its entirety.

BACKGROUND

Automated infrastructure management (AIM) systems are typically used to automatically detect and document changes in patching connections made using structured cabling systems. Such patching connections are typically made by connecting two or more connections points (also referred to here as a "ports") located on the front side of patching equipment (such as patch panels). These patching connections are made using patch cords that are connected to the ports.

Typically, each port on the front of an item of patching equipment is connected by the patching equipment to a cable that is terminated at the rear of the patching equipment. Changes to such rear cables typically occur infrequently (for example, when the patching equipment is first installed or during building remodeling). This cabling is also referred to here as "fixed cabling." The other ends of such fixed cabling can be terminated at wall outlets that are located in the work area, consolidation points location near the work area, or at other patching equipment. In order to automatically detect changes in patching connections, such patching equipment typically includes, for each port, a respective sensor, reader, interface, or other circuitry (collectively referred to here as a "sensor") for use in determining the presence of, and/or information from or about, a connector and/or cable attached to the front of the associated port. The sensors are typically coupled to a controller, which receives and aggregates such port information and communicates it to a system manager for storage in a database. Such a controller can be deployed in each item of patching equipment or in a unit that is separate from the patching equipment. One example of the latter type of controller is a "rack controller" that is deployed in the same or nearby rack as the associated items of patching equipment.

Typically, sensors and the means for provided power and connectivity thereto is integrated into the patch equipment. However, the ability to provide this functionality is inhibited for legacy network facilities where the network equipment lacks the necessary hardware to sense and communicate port state information. Moreover, the existing network chassis and equipment racks at these facilities may lack the physical space necessary to install the port sensing and monitoring hardware and wiring to support desired managed connectivity functions.

For the reasons stated above and for other reasons stated below which will become apparent to those skilled in the art upon reading and understanding the specification, there is a need in the art for systems and methods for network port monitoring using low energy wireless communications.

SUMMARY

The Embodiments of the present disclosure provide system and methods for network port monitoring using low energy wireless communications and will be understood by reading and studying the following specification.

Systems and methods for network port monitoring using low energy wireless communications are provided. In one embodiment, a device comprises: at least one port module, the at least one port module comprising one or more connector ports each configured to receive a connector of a network data cable; and a port state sensor that includes a port sensing circuit coupled to a sensor controller, wherein the port sensing circuit is configured to sense a port state for the one or more connector ports; wherein the sensor controller is configured to input the port state from the port sensing circuit, wherein in response to detecting a change in the port state from the port sensing circuit, the sensor controller wirelessly transmits port state information to a port state monitor.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure include self-contained port sensor modules which can sense network port state changes, and dynamically communicate port state information in real-time to a central port state monitor using a low energy wireless protocol such a Bluetooth Low Energy (BLE). As discussed below, the self-contained modules dynamically respond to sensed changes in port state and wirelessly forward that information to a port state monitor in real time. Because the modules are self-powered, and because they use low energy wireless communication links to communicate port state changes, the need to retrofit legacy panels with new wiring is substantially avoided. In addition, the centralized port state monitor may be located where room is available independent of wiring concerns. Moreover, as explained below, utilization of a low energy wireless protocol permits containment of wireless communication signals within a chassis so that the entire spectrum of the wireless protocol (for example, the entire BLE spectrum including all advertising channels and all data channels) may be made available for communicating port state information within that chassis.

Figure 1:
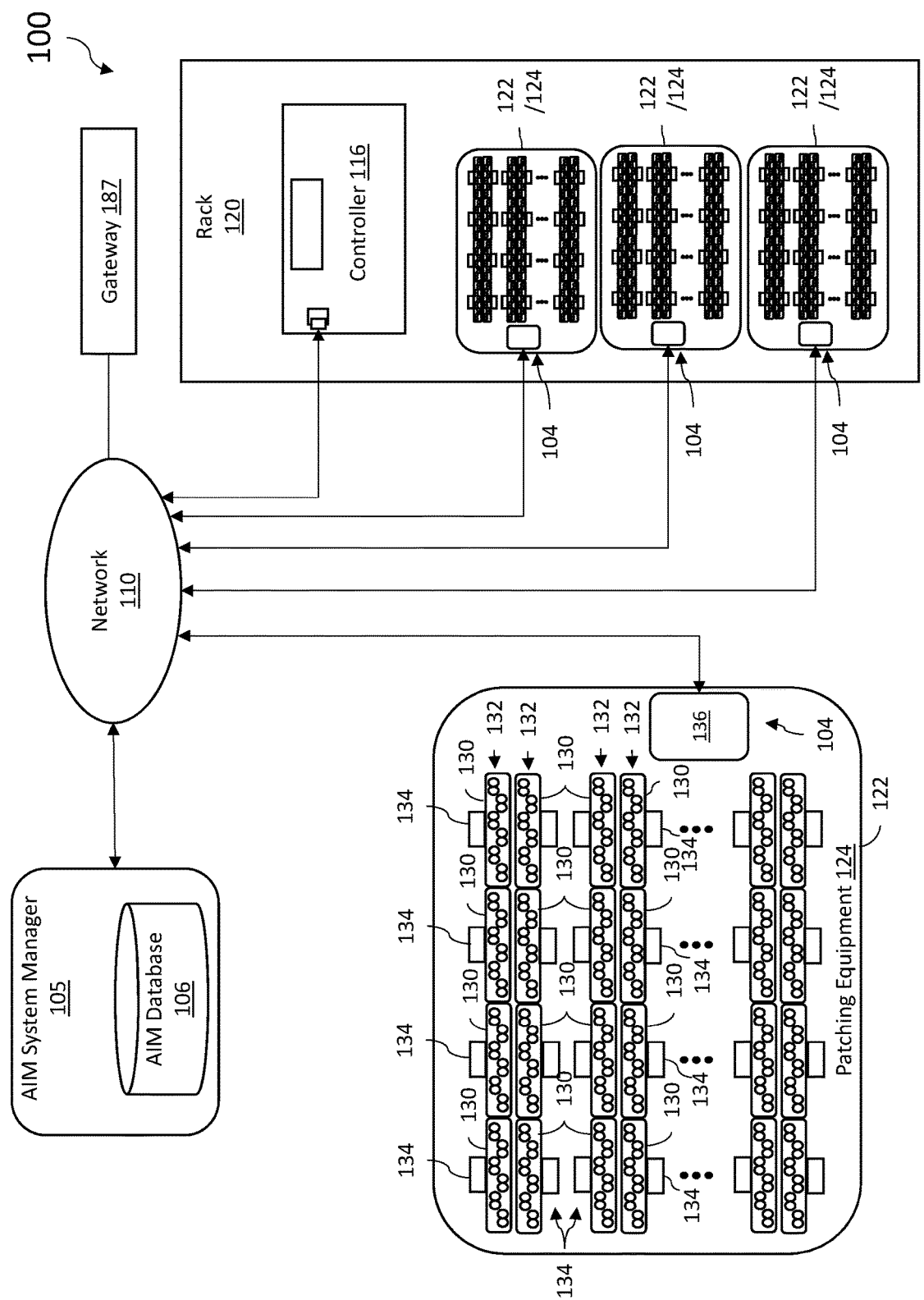
FIG. 1 is a diagram of an automated infrastructure management system of one embodiment of the present disclosure.

FIG. 1 is a block diagram of one exemplary embodiment of an automated infrastructure management (AIM) system 100 that is configured to track connections made using items of patching equipment 124. The connections can be made with various types of cabling, including, without limitation, copper cables and fiber optic cables. The system 100 shown in FIG. 1 can be implemented in a data center or enterprise application. Other embodiments can be implemented in other ways (for example, where the system 100 is implemented in a central office or other facility of a telecommunication service provider and/or in another part of the telecommunication service provider's network).

The patching equipment 124 is housed within a chassis 122 and is optionally deployed in racks 120 along with a rack controller 116 and other items of equipment (not shown) (such as servers, routers, and switches). The AIM system 100 is configured to track connections made at the patching equipment 124 as well as connections with the other equipment. In one aspect illustrated in FIG. 1, the AIM system 100 is configured to work with patching equipment 124 (such as patch panels) that has AIM functionality 104 for tracking connections made at the ports 132 located on the front (or patching) side of the patching equipment 124. This patching equipment 124 is also referred to here as "intelligent" or "managed" patching equipment 124.

In one aspect illustrated in FIG. 1, for each port 132 of the associated item of patching equipment 124, the AIM functionality 104 comprises a sensor, reader, interface, or other circuitry (collectively referred to here as a "sensor") that defines a component of a port state sensor 134 for use in determining the presence of, and/or information from or about, a connector and/or cable attached to the associated port 132. The AIM functionality 104 can be implemented in many different ways and the particular configuration illustrated in FIG. 1 is merely exemplary and should not be construed as limiting.

In one aspect illustrated in FIG. 1, each unit of patching equipment 124 includes at least one port module 130. In some embodiments, a port module 130 comprises a modular plate or fixture that may be installed into predefined locations (which may be identified by slot numbers and/or slot position) within the patching equipment 124. Each of the port modules 130 shown in FIG. 1 comprises a plurality of ports 132 into which network data cables may be coupled via connectors (for example, plugs). However, it should be understood that in alternate implementations of any of the embodiments described herein, a specific port module 130 may instead comprise any number of ports including a single network port 132.

For the particular example illustrated in FIG. 1, each port module 130 comprises 6 duplex Lucent Connector (LC) ports that facilitate fiber optic network data cable connections to the patching equipment 124. In various other embodiments, the ports 132 may compatible with other optical fiber connector formats such as Standard Connector (SC), multiple-fiber push-on/pull-off (MPO/MTP) connectors, or other connectors suitable for connecting to optical fibers known to one having skill in the art. In still other embodiments, the ports 132 may couple with network data cables comprising electrical conductors such as, but not limited to, coaxial cable, Category (CAT) 5, CAT 6A, CAT 7, CAT 8, or other cable that is able to function as a physical medium for the transmission of data. In some embodiments, network data cables coupled to the ports 132 may comprise hybrid cables that include both optical fibers and electrical conductors. It also should be understood that the patching equipment 124 discussed herein, may comprise any type of device used by a network such as, but not limited to patching equipment (for example, patch panels) as well as servers, switches, routers, and the like.

System 100 is a managed system in the sense that the connection of each of the ports 132 to respective cables is monitored and reported back to a server or other network system such as an AIM System Manager 105 via network 110. In one aspect, the AIM system manager 105 is configured to compile asset and connection information and to provide an end-to-end trace of connections. The AIM system manager 105 stores the asset and connection information in an AIM database 106. The AIM system manager 105 and AIM database 106 can be implemented using one or more computers on which appropriate software is executed.

The port state sensors 134 detect if a cable is connected to and/or disconnected from ports 132 of patching equipment 124. Various types of AIM technology can be used to detect such connections. In general, a connection event can be considered to have occurred when a port 132 that was previously in an "empty" or "disconnected" state (that is, a state in which no cable is connected to the associated port 132) changes to a "connected" or "occupied" state (that is, a state in which a cable is connected to the associated port 132). Likewise, a disconnection event can be considered to have occurred when a port 132 that was previously in the connected state changes to the disconnected state. These connection-related events can be detected explicitly by the port state sensors 134 or implicitly by detecting changes in the connection states of ports 132.

As shown in the example embodiment of FIG. 1, each of the port modules 130 comprises a port state sensor 134 that monitors each port 132 on that port module 130 to sense if the port is either 'empty' or 'occupied'. The port state sensor 134, as described in greater detail below, wirelessly conveys that information to the port state monitor 136, which is configured to wirelessly communicate with each of the plurality of port state sensors 134 that may be installed on the patching equipment 124. For example, in the embodiments shown in FIG. 1, each patching equipment 124 comprises within its chassis 122 a port state monitor 136 that collects port state information from the port state sensors 134 also co-located within that chassis 122. However, in other implementations, a port state monitor 136 may collect port state information from port state sensors 134 located across multiple patching equipment 124. For example, a port state monitor 136 may operate across the multiple chassis 122 of a network rack 120.

Based on the collect port state information, the AIM System Manager 105 is made aware of whether specific ports 132 are occupied or empty. In some embodiments, the AIM System Manager 105 comprises a database 106 that stores port state information for each of the ports 132 and/or tracks the occurrence of port state changes. By accessing the AIM System Manager 105, an operator of network distribution system 100 can determine which ports 132 on each of the patching equipment 124 is considered 'empty' or unused, and alternatively which are 'occupied' by a cable that is plugged into the port. Knowledge of port state may be used, for example, to determine current capacity utilization and/or plan for resource expansion. In other implementation, the AIM System Manager 105 may combine port state information with other information to generate network connectivity maps, or for cable tracing. In some embodiments, the AIM System Manager 105 may be accessible to users or applications via the public Internet which may be coupled to network 110 via a gateway 187.

Figure 2:
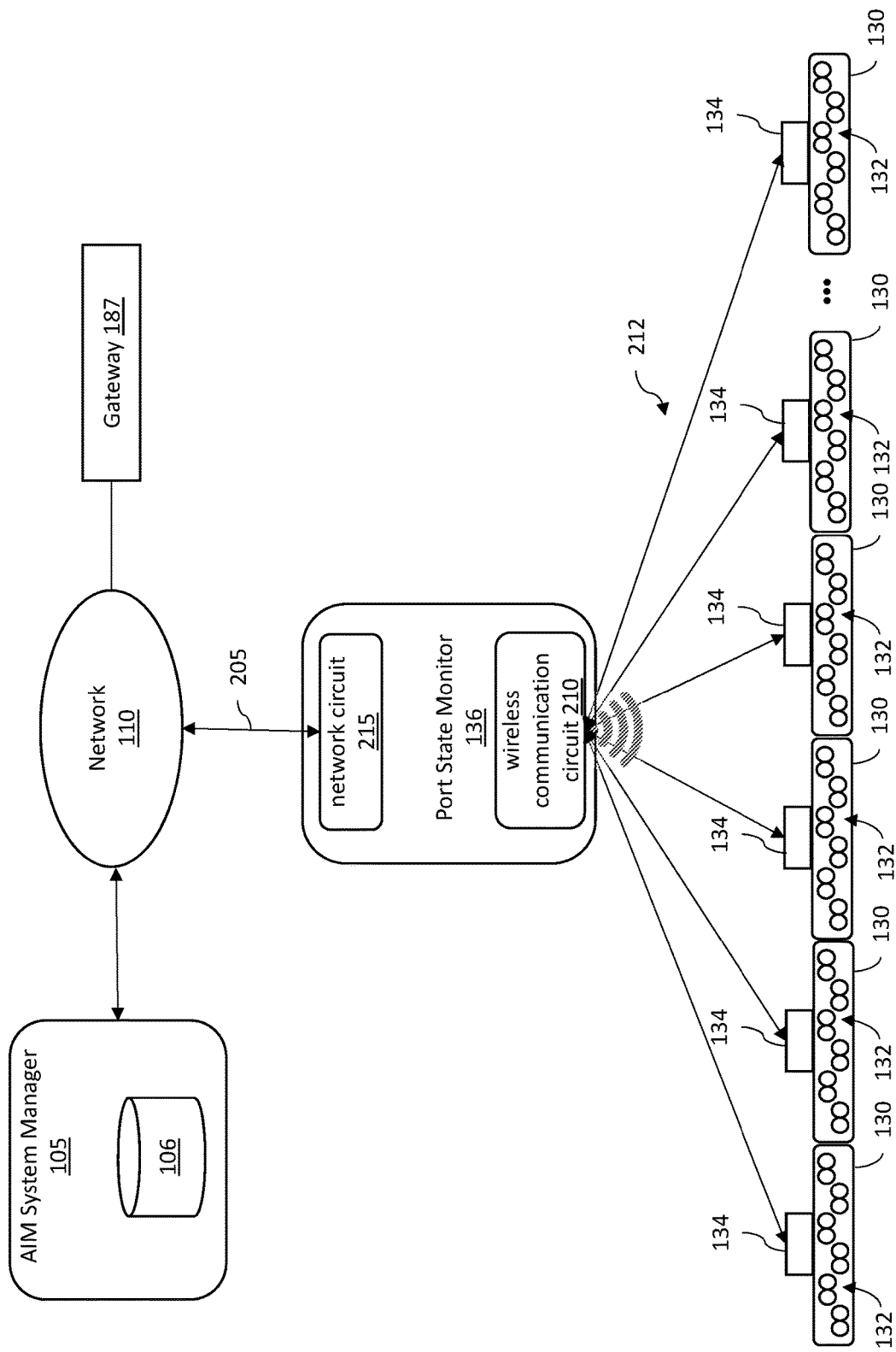
FIG. 2 is a diagram of an automated infrastructure management system of one embodiment of the present disclosure.

Referring next to FIG. 2, each port module 130 operates as a self-contained unit that reports port state information to the port state monitor 136. The port state monitor 136 includes a wireless communications circuit 210 used to exchange port state information with the port modules 130 using low energy wireless communications (shown at 212), and a network interface circuit 215 to establish either a wired or wireless connection 205 with the network 110.

In operation, the port state monitor 136 collects port state information from the port state sensors 134 and is programmed to convey the port state information to the AIM System Manager 105 via network 110. Utilizing wireless connectivity (shown at 212) to relay port state information between the port state sensors 134 and the port state monitor 136 provides several advantages. For example, the port state monitor 136 may be positioned at a convenient location within the chassis 122 while avoiding the need to run additional wiring to the port state sensors 134, which is ideal where an existing network patching equipment 124 is being retrofit to include managed connectivity capabilities. Moreover, additional port modules 130 may be added, or exiting port modules 130 replaced, without the need to run, or re-run, wiring to the port state monitor 136. Although the port state monitors 136 are described here as being configured for use with patching equipment, it is to be understood that such port state monitors 136 can also be configured for use with equipment such as such as servers, routers, switches, wall outlets, consolidations points, etc.

Figure 3:
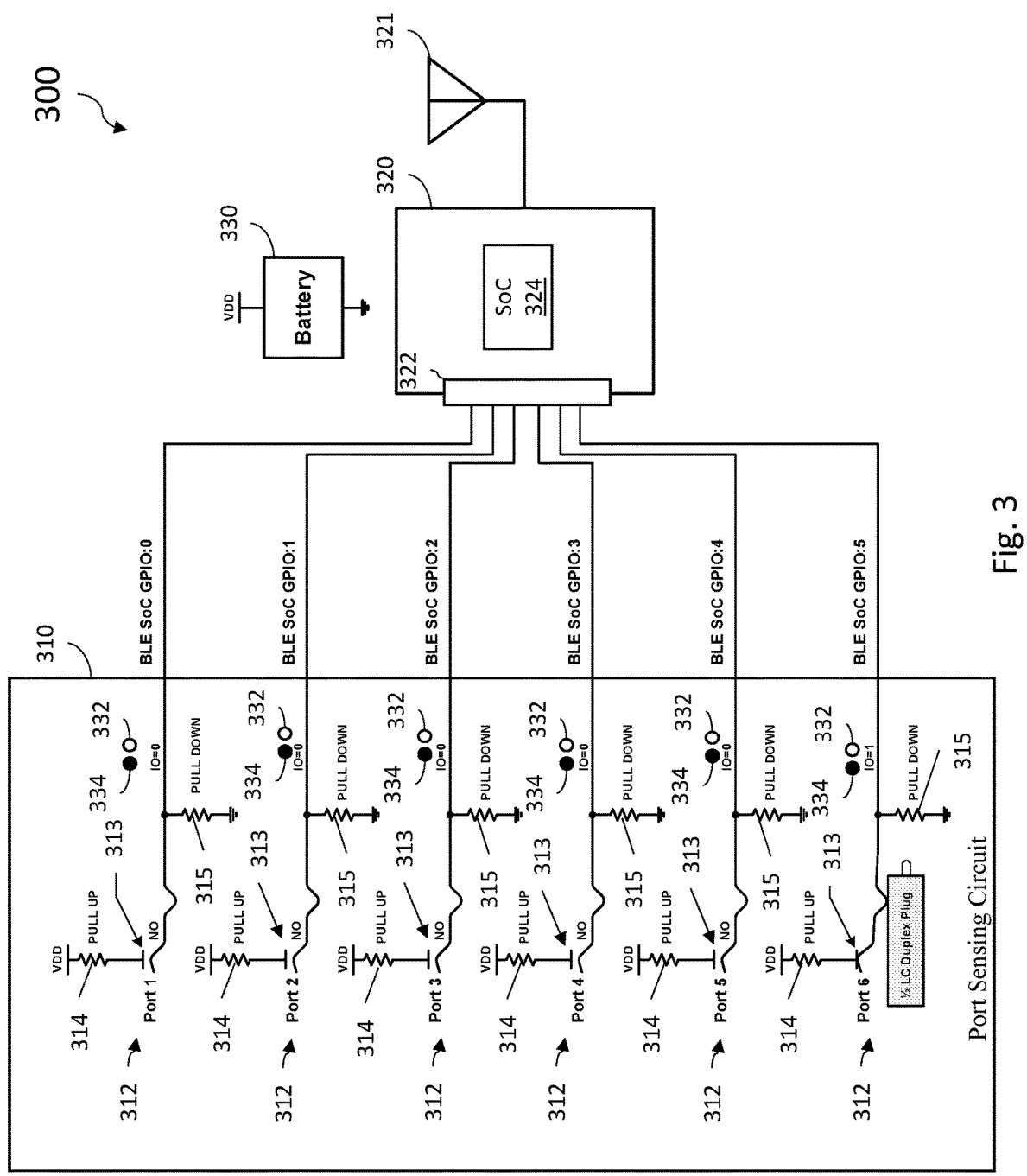
FIG. 3 is a diagram of a port state sensor of one embodiment of the present disclosure comprising a port sensing circuit and sensor controller.

FIG. 3 is a diagram illustrating an example port state sensor 300 of one embodiment of the present disclosure for realizing a port state sensor 134 such as discussed and shown in the embodiments above. In this embodiment, port state sensor 300 comprises a port sensing circuit 310 coupled to an I/O port 322 of a sensor controller 320. The sensor controller 320 is coupled to an antenna 321 to facilitate wireless communication with the port state monitor 136. In some embodiments, sensor controller 320 may comprise a processor and memory which are implemented, for example, using a System-on-a-Chip (SoC) 324. Port sensing circuit 310 comprises one port occupancy sensor 312 for each port 132 located on a port module 130. Power to operate the sensor controller 320 and port sensing circuit 310 of the port state sensor 300 may be provided by a battery 330. In some embodiments, the battery 330 may comprise a coin cell battery, which may be expected to provide several years of battery life.

In the embodiment shown in FIG. 3, each of the port occupancy sensors 312 comprises a contact switch 313 that changes state in response to the physical insertion of a cable connector into a corresponding port 132. In this particular embodiment, contact switch 313 remains in an open state when its corresponding port 132 is empty (i.e., the switch is normally open), and becomes maintained in a closed state when its corresponding port 132 is occupied by a cable connector. A first contact of contact switch 313 is tied to a voltage bus ($V_{DD}$) through a pull-up resistor 314 and the second contact of the contact switch 313 is tied to chassis ground through a pull-down resistor 315 and electrically coupled to one bit of the I/O port 322. In one embodiment, one of the contacts of contact switch 313 may comprise a printed circuit board pad while the other contact is a movable conducting member.

With this configuration, when a port 132 is empty, the associated contact switch 313 is open and the voltage level of the line to the I/O port 322 is pulled down to a level defined as a logical 0. When the port 132 is occupied, the associated contact switch 313 is forced closed so that a voltage divider network is formed between $V_{DD}$ and the chassis ground with the contacts of the contact switch 313, the voltage of the line to the I/O port 322 becomes $V_{DD} \times (R_{pull-down}/(R_{pull-up}+R_{pull-down}))$, which can be defined internally by the sensor controller as a logical 1. The same is true for each of the port occupancy sensors 312, which each providing a logical 0 or 1 input to a different bit of the I/O port 322. The result is a multi-bit word that is presented to the I/O port 322 of sensor controller 320. These bits convey the port state (empty or occupied) of each of the ports 132 on that module 130. Each time a cable is plugged-in, or removed from, any of the ports 132 on that module, the value of the multi-bit word that is presented to the I/O port 322 changes to a corresponding value.

It should be appreciated that the particular port occupancy sensors 312 illustrated in FIG. 3 are intended only to provide an example of a circuit that may be used to provide port state information to the I/O port 322. In other implementations, other sensors, such as optical or magnetic sensors, may be used to determine if a port is empty or occupied, and provide that information as a logic bit, or in another format, to the sensor controller 320.

For example, another type of AIM technology makes use of so-called "ninth wire" or "tenth wire" technology. Ninth wire/tenth wire technology makes use of special cables that include one or more extra conductors or signal paths that are used for determining which port each end of the cable is inserted into. Yet another type of AIM technology makes use of an Electrically Erasable Programmable Read-Only Memory (EEPROM) or other storage device that is integrated with or attached to a connector on a cable. The storage device is used to store an identifier for the cable or connector along with other information. The port (or other connector) into which the associated connector is inserted is configured to read the information stored in the EEPROM when the connector is inserted into the front side of a port of a patch panel or other item of patching equipment. For reading of information from storage devices in this manner, the port occupancy sensors 312 can also be configured to (or include separate sensors that are configured to) explicitly sense the connection states of the associated ports. Alternatively, the connections states of the associated ports 132 can be determined implicitly by determining whether or not it is possible to read information from storage devices associated with connectors or cables connected to the associated ports 132 (for example, where if it is possible, the associated port 132 is considered to be in the connected state and if it is not possible the associated port 132 is considered to be in the disconnected or empty state). A similar approach can be used with optical machine-readable representations of data (such as barcodes or QR codes). Another type of AIM technology makes use of radio frequency identification (RFID) tags and readers. With RFID technology, an RFID tag is attached to or integrated with a connector on a cable. The RFID tag is used to store an identifier for the cable or connector along with other information. The RFID tag is typically then read using an RFID reader after the associated connector is inserted into a port (or other connector) of a patch panel or other item of patching equipment. Still other types of AIM technology can be used. The specific information conveyed from the port occupancy sensors 312 to the I/O port 322 of sensor controller 320 will vary with the specific technology used to realize the port occupancy sensors 312, but will at least convey the port state of the associated port 132.

In one aspect, for each port 132 of the associated item of intelligent patching equipment 124, port state sensor 300 further comprises one or more visual indicators 332 (such as one or more light emitting diodes (LEDs)) for providing a visual indication to a user, for example, to enable the user to visually identify that particular port 132. In one aspect, for each port 132 of the associated item of intelligent patching equipment 124, the port state sensor 300 also comprises a respective user-input device 334 (such as a button) by which a user is able to select that port 132. Each port occupancy sensor 312, visual indicator 110, or user-input device 112 can be associated with a single port 132 or can be associated with multiple ports 132 (for example, these items can be associated with all of the ports 132 or with a subset of ports 132 such as a row or other grouping of ports 132). The sensor controller 320 is configured to execute software that reads or otherwise receives information from each port occupancy sensor 312, controls the state of each visual indicator 332, and determines the state of each button 324. The port occupancy sensor 312, visual indicator 332 and/or button 324 can be natively integrated into the patching equipment 124 or can be integrated into a port module 130 or packaged into a retrofit kit with the port module 130 that can be installed on already deployed patching equipment 124.

In some embodiments in operation, the sensor controller 320 may be maintained in a low-power or near-sleep mode during steady-state conditions, which is interrupted when a port state change is detected (for example, when a change is detected in at least one bit of the multi-bit word applied to I/O port 322). In response to the detected port state change, the sensor controller 320, switch to an active power mode, reads the I/O port 322 and transmits to the port state monitor 136 the updated port state information. This process is further detailed below. In some implementations, the sensor controller 320 may communicate to the port state monitor 136 the status of all the ports 132 by transmitting a single multi-bit word where each bit represents a status of one of the several ports 132 monitored on that module 130. In other embodiments, the sensor controller 320 may communicate port state information to the port state monitor 136 using other data formats (for example, using one or more bytes or word to convey the information for each port). This latter technique has an advantage in that it is scalable and extendable, and not locked to a particular multi-bit word length.

As stated above, the sensor controller 320 for each a port state sensor 134 wirelessly communicates port state information to the port state monitor 136. In one embodiment, this communication is implemented using Bluetooth Low Energy (BLE) protocols over 2.4 GHz radio frequencies (i.e., as introduced by the Bluetooth Special Interest Group (SIG) and appearing in the Bluetooth Core Specification versions 4.0 through 5). In such embodiments, each port module 130 acts within the system as a separate BLE peripheral and the port state monitor 136 serves within the system as a BLE central device.

The placement of the port state monitor 136 within a chassis 122 to collect port state information from co-located port state sensors 134 significantly reduces wireless signal propagation outside the chassis. Containing wireless communications within a chassis 122 means that the entire spectrum of the wireless protocol (for example, the entire BLE spectrum including all advertising channels and all data channels) may be made available for communicating port state information within that chassis. For example, a metal frame and surfaces of the chassis 122 may serve as an effective Ferriday cage so that wireless communications from any adjacent patching equipment 124 will have minimal to no interference with communications between the port state sensors 134 and port state monitor 136 within other chassis.

Interference with wireless communications between adjacent patching equipment 124 may also be minimized by reducing the RF launch power of signals transmitted between the modules 130 and port state monitor 136 to minimize leakage of signals outside of the chassis 122. As should be appreciated, factors such as the proximity of a module 130 to the port state monitor 136, the relative orientation of their respective antennas, and the presence of any signal attenuating obstacles within the chassis, will affect the RF power necessary to reliably communicate. In some embodiments, the port state sensors 134 and port state monitor 136 may dynamically perform a handshake to determine an optimal RF launch power that will facilitate reliably communications while minimizing any excess power beyond what is necessary to reliably communicate. Metrics such as perceived signal indications and/or signal to noise ratio may be measures and compared against threshold acceptance criteria to determine when reliable communications have been obtained. In this way, a port state monitor 136 and the port state sensors 134 with which it connects can dynamically configure their signal powers to obtain to optimize communications within the chassis 122.

Figure 4:
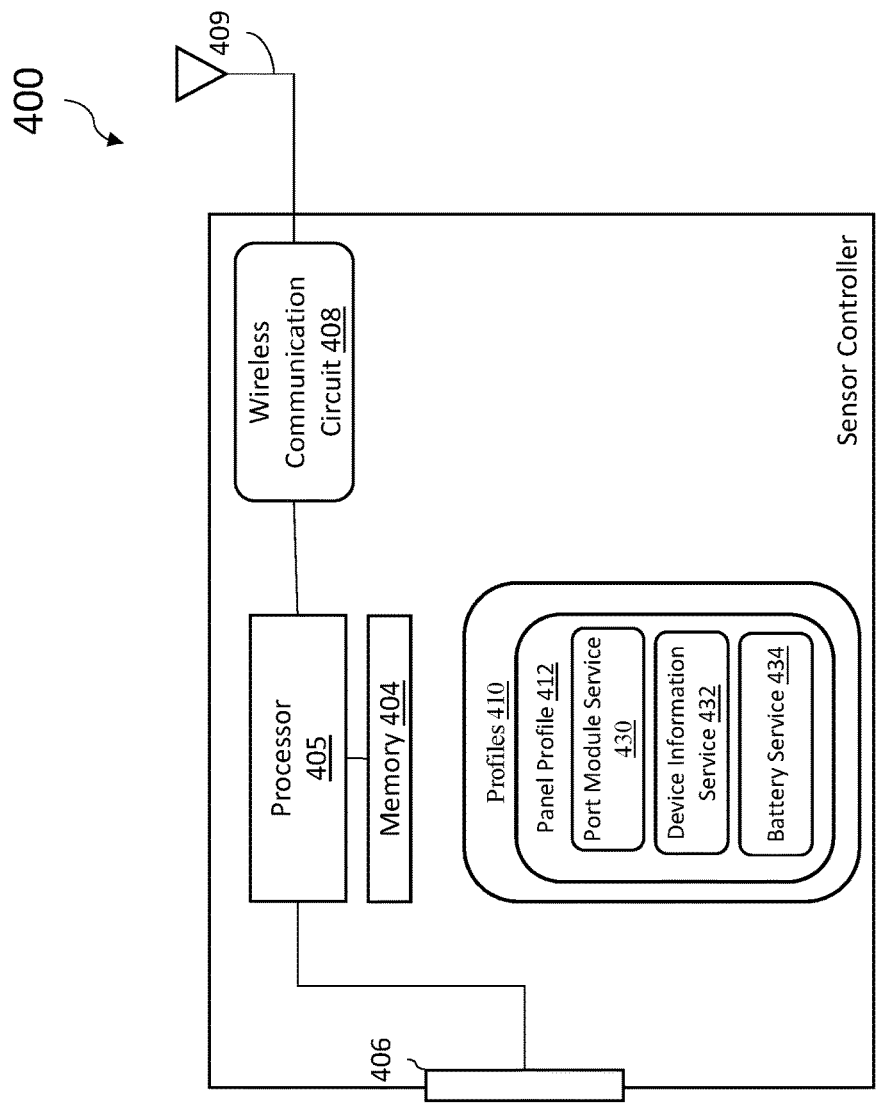
FIG. 4 is a diagram of a sensor controller for port state sensor of one embodiment of the present disclosure.

FIG. 4 is a diagram of a sensor controller 400 for a port state sensor 134. For example, in some embodiments, sensor controller 400 may be used to implement the sensor controller 320 of the port state sensor 300 described in FIG. 3. Sensor controller 400 comprises a processor 405 coupled to a memory 404. In some embodiments, the processor 405 implements the functions attributed to the sensor controllers 320/400 described herein through the execution of code stored in memory 404. Sensor controller 400 further comprises an I/O port 406 (corresponding to the I/O port 322 discussed above) and a low energy wireless communication circuit 408 (such a BLE circuit), each coupled to the processor 405. The wireless communication circuit 408 is coupled to an antenna 409 (corresponding to antenna 321 discussed above) to facilitate wireless communication between the sensor controller 400 and the port state monitor 136. In some embodiments, one or more of the components of sensor controller 400 may be implemented using a System-on-a-Chip. The sensor controller 400 further comprises one or more profiles 410, which define and implement services which are executed by processor 402 and can be accessed by a port state monitor 136 over the wireless connectivity 212. In the particular embodiment shown in FIG. 4, the profiles 410 include a panel profile 412 that defines services specifically associated with the configuration and operation of the port module 130 that comprises the sensor controller 400. For example, the panel profile 412 may comprise a port module service 430 as well as a device information service (DIS) 432 and a battery service (BAS) 434. Through the DIS 432, information regarding the hardware of the module 130 may be requested, such as but not limited to manufacture and/or vendor information and the model number and/or serial number, current hardware, software and firmware revisions, and the like. Through the BAS 432, information regarding the current charge and health of the battery 330 may be obtained. In some embodiments, the DIS 432 and BAS 434 are standard services within profiles of a BLE stack as defined by Bluetooth SIG specifications and standards.

Figure 4B:
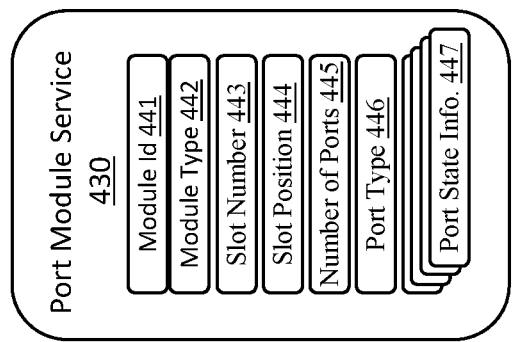
FIGS. 4A and 4B are each diagrams illustrating a port module service implemented by a sensor controller for one embodiment of the present disclosure.
Figure 4A:
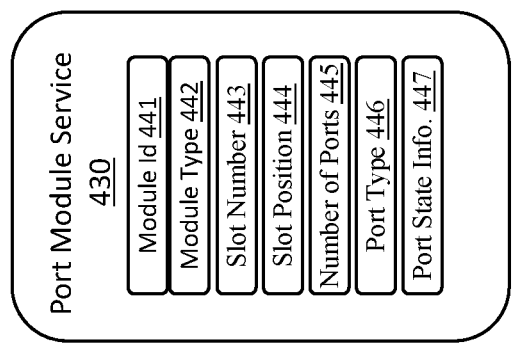

The port module service 430 comprises a service of the panel profile 412 designed to provide information to the port state monitor 136 relevant to ports 132 of the module 130 (such as but not limited to their current state). Through the wireless transmission of advertising messages, the port module service 430 can advertise the services that it supports. As discussed below, such information may be used by a port state monitor 136 to determine the devices it wishes to wirelessly communicate with. As shown in FIGS. 4A and 4B, the port module service 430 provides information that is specific to their associated module 130. Such information may be stored as data objects that include, but are not limited to, a module identifier (ID) 441, module type 442, the chassis slot number 443 and slot position 444 (indicating where in the chassis 122 this particular module 130 is installed), the number of ports 132 supported by that module 130 (shown at 445) as well as the type of port the ports 132 comprise (such as a fiber port, coaxial port, or a multiconductor port (such as an Ethernet port, for example) shown at 446. In some embodiments, the port type 446 may be even more specific in identifying which type of cables are supported by the port (for example, an LC port, SC port, fiber MPO port, LC port full duplex, LC port half duplex, etc.). The port module service 430 also provides port state information 447 which conveys the status of each port 132, for example, whether occupied or empty. In some embodiments, optional additional states may be included in the port state information 447. For example, bitwise arrays may be included to support bitwise mapping. Error states may be included, for example a "fail" state to indicate when a detectable sensor or port failure exists, or an enable/disable state that reflects if a port is enabled or disabled.

In some embodiments, such as shown in FIG. 4A, port state information 447 may comprise a single data object that includes a bit-wise binary representation of the inputs to I/O port 322, with each bit stored in port state information 447 representing the status of a specific port 132. In other embodiments, such as shown in FIG. 4B, the port state information 447 is stored as multiple data objects, one for each port 132 of module 130 which includes at least information representing the state of a specific a port 132. In some embodiments, data objects such as the slot number 443 and slot position 444 data objects may be read/write data objects that are configured upon installation of the module 130 into a patching equipment 124. For example, a technician installing the module 130 may manually enter the slot number 443 and slot position 444. In other embodiments, the module 130 may be able to self-determine the slot number 443 and slot position 444 in which it was installed (for example by reading a hardware key or tag provided at the installation point on the chassis 122). Other data objects such as module ID 441, module type 442, the number of ports 445 and type of ports 446 may be factory set and read only. The data objects storing port state information 447 may be accessible as read/write to the processor 402, but otherwise provide read only access to any other component. For example, where the port state information 447 includes enable/disable states, the port status of each port 132 (i.e., whether occupied or empty) is broken out as a service read only object while enable/disable states are service read/write objects to external devices, such as port state monitor 136 for example.

An optional implementation may allow slot number 443 and slot position 444 to be missing from the port module service 430, and have this information configured in the port state monitor 136 and associated with a specific module ID 441 of a module 130 installed within the patching equipment 124. In some embodiments, the module ID 441 is a globally unique value to identify a module 130. Moreover, in some implementations, a module ID 441 may not be included as a data object in the port module service 430. In such cases, a module 130 may be uniquely identified using a device address such as a BLE device address, for example.

Figure 5:
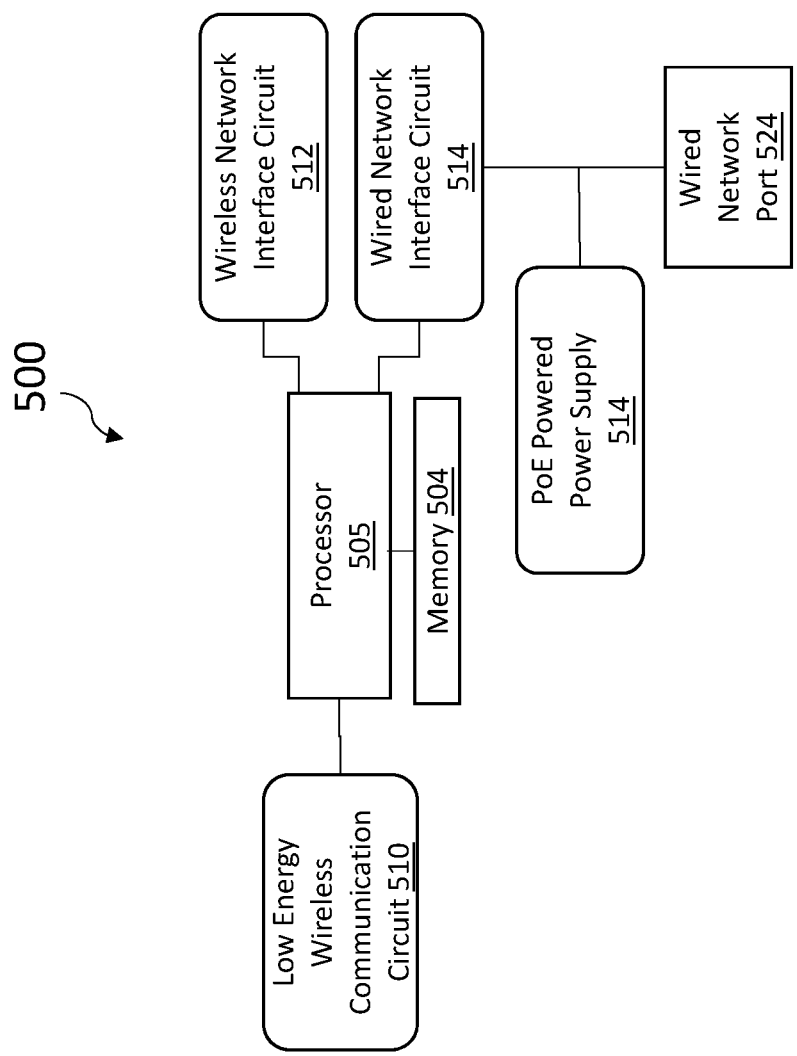
FIG. 5 is a diagram illustrating a port state monitor for one embodiment of the present disclosure.

FIG. 5 is diagram of a port state monitor 500 which may be used to implement the port state monitor 136 described herein. Port state monitor 500 includes a processor 505 coupled to a memory 504. In some embodiments, the processor 505 implements the functions attributed to the port state monitor 136 as described herein through the execution of code stored in memory 504. Port state monitor 500 further comprises a low energy wireless communication circuit 510 (corresponding with wireless communication circuit 210) which can communicate with the wireless communication circuit 408 of the sensor controller 400 described above to establish the short-range wireless data connectivity 212 between modules 130 and the port state monitor 136. As such, the wireless communication circuit 510 may be implemented using a BLE standard compliant wireless communication circuit. In order to provide connectivity between the port state monitor 500 and Network 110, the port state monitor 500 may comprise a wireless network interface circuit 512 (such as an IEEE 801.11 Wi-Fi interface, for example), a wired network interface circuit 514 (such as an IEEE 802.3 Ethernet interface, for example), or both.

In some embodiments, electric power to operate the port state monitor 500 may be supplied using Power-over-Ethernet (PoE). For example, in some embodiments, the port state monitor 500 further comprises a PoE powered power supply 514 which receives PoE electric power for operating the port state monitor 500 over the same wired network port 524 that provides data connectivity with network 110.

In operation, when a module 130 is initialized and becomes active, it pairs with the port state monitor 500 and wirelessly passes port state information to the port state monitor 500. Processor 505 collects the port state information from each port state sensor 134 of each module 130 of patching equipment 124, and forwards the port state information upstream, for example to the AIM System Manager 105. Processor 505 also retains current configuration and occupancy data by storing this data in non-volatile storage 504.

Communications to the cloud or AIM System Manager 105 can be accomplished using standard 802.3 Ethernet or 802.11 Wi-Fi. These same network protocols through which the port state monitor 500 forwards port state information upstream to the AIM System Manager 105 may be used to allow a customer to communicate with a specific patching equipment 124 for direct queries. For example, in one embodiment, the processor 505 may implement a Representational State Transfer (REST) interface or web service accessible from the network 110 to enable 2-way communication from a cloud host, AIM System Manager 105, or other customer platform in order to submit a direct query to a port state monitor 500 of a particular panel 224.

In one embodiment, in operation, when a module 130 is initially installed in patching equipment 124 and initialized, port state sensor 134 will begin to advertise its existence by transmitting wireless advertisement signals over an advertising channel. The port state monitor 136 will receive and recognize the advertisement signal from the newly installed module 130, but because the module is not yet configured, port state monitor 136 will initially decline to further communicate with the newly installed module 130. A technician may connect to the module 130 to configure the port state sensor 134 with information such as, but not limited to, the slot number and position within the patching equipment 124 in which it was installed. In some embodiments, this configuration information may be obtained by the module 130 directly from components within the patching equipment 124. During configuration, the Port Module Service 430 of the Panel Profile 412 is activated. The port state sensors 134 is restarted and will again begin to transmit wireless advertisement signals over an advertising channel, but this time the advertisement signal will advertise services indicating that the Port Module Service 430 from this module 130 is now active. The port state monitor 136 with thus now recognize the new module 130 as a properly configured module based on the advertisement of the Port Module Service 430. The port state monitor 136 may obtain module specific information from the Port Module Service 430 (such as any of the associated data objects described above). The port state monitor 136 may then proceed to register that module 130 and its ports 132 as being components of the patching equipment 124 in which they are installed, and obtain and forward the port state information for the ports 132 of that module 130. Registration of the new module 130 and its port state information may be communicated to the AIM System Manager 105. Once the new module 130 completes the initial information exchange with its port state monitor 136, port state sensor 134 will switch over to operating in low power mode to conserve power as described below.

Figure 6:
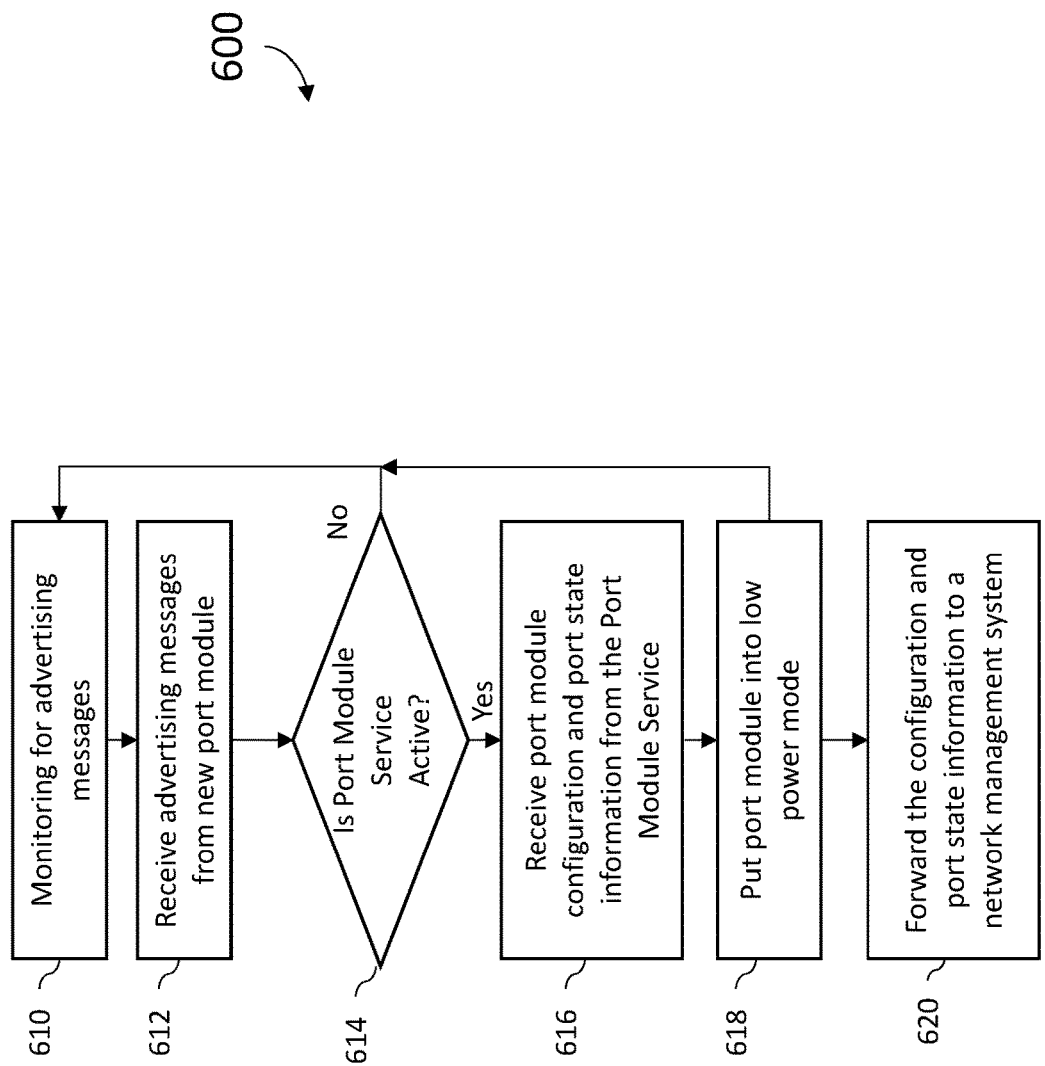
FIG. 6 is a diagram illustrating a method of one embodiment of the present disclosure.

FIG. 6 is a flowchart providing an example embodiment of a method 600 for establishing port state monitoring for a device (for example, patching equipment) of an automated infrastructure management system. It should be understood that the features and elements described herein with respect to the method shown in FIG. 6 and the accompanying disclosure may be used in conjunction with, in combination with, or substituted for elements of any of the other embodiments discussed herein, and vice versa. Further, it should be understood that the functions, structures and other description of elements associated with embodiments of FIG. 6 may apply to like named or described elements for any of the Figures and vice versa. The method begins at 600 with monitoring for advertising messages. Upon receiving an advertising message from a new port module (shown at 612), the method proceeds to 614 where it is determined based on the advertising message whether the port module service of the new port module is active. As described above, the port module service is initially not active but is activated as part of the configuration of the port module. If the port module service is not active, the method 600 return to monitoring for advertising messages at 610. In other words, if the port module service is not indicated as being active in the advertising message, the port state monitor will not respond and essentially ignore advertising message from that port module. If the port module service is active, the method 600 proceeds to 616 and obtains configuration and port state information from the new port module as described above. In some embodiments, communication of the configuration and port state information is implemented by accessing the port module service as described above. The method 600 next proceeds to 618 and directs the newly accepted port module to enter low power mode. In some embodiments, by initiating an action to disconnect from the port module, that action is interpreted by the port module as an instruction to enter low power mode (described in greater detail below). In one embodiment, the method 600 then proceeds to 620, where the port state monitor forwards the configuration and port state information, for example, to a network management system, or other server or node via the Network 110.

Once properly configured, port state sensors 134 operate in steady state in a low power mode to in order to conserve power. While in low power mode, a port state sensor 134 may periodically transmit a "heartbeat" beacon (for example, on the order of once every 5 seconds) on an advertising channel. The purpose of this beacon is to inform the port state monitor 136 that the port state sensor 134 remains operable, though in low power mode. Ceasing to receive the beacon from a port module 130 would be interpreted as detecting a fault affecting the port module 130. In some embodiments, when the battery power becomes depleted, the battery service 434 includes a low power indication that may be transmitted with or as part of a heartbeat beacon. It should be understood that in still other embodiments, any detectable port state sensor 134 or port module 130 fault may be indicated by information in the heartbeat beacon. Other than transmitting the heartbeat beacon, the port state sensor 134 generally refrains from other communications with the port state monitor 136 while in low power mode in order to conserve power.

In one embodiment, the port state sensor 134 will wake from low power mode and enter an active power mode when a port state change is detected at I/O port 322. It should be understood that in some embodiment, additional events may cause the port state sensor 134 to wake from low power mode and enter an active power mode, such as but not limited to detectable port state sensor 134 and/or port module 130 fault conditions. Upon entering active power mode, the module 130 begins to rapidly and repeatedly transmit an advertising message using the port module service 430. For example, an advertising message indicating a port state change may be transmitted on the order of once every 100 msec. At this transmission rate, the port state monitor 136 expect to quickly establish a communication with the module 130 and receive updated port state information from the port module service. Once the port state monitor 136 receives the updated port state information, it may instruct the module 130 to disconnect. Upon receiving the disconnect instruction, the port state sensor 134 can be confident that the port state information was conveyed to the port state monitor 136, and resume operation in low power mode until another port state change is detected.

In some embodiments, it may be unnecessary for a port state sensor 134 and port state monitor 136 to establish a full connection in order for the port state sensor 134 to communicate port state information. For example, upon detecting a port state change at I/O port 322, the port state sensor 134 may wake low power mode, enter the active power mode, and begin to rapidly and repeatedly transmit an advertising message that indicates the port state change using the port module service 430. That is, the advertising message from the port state sensor 134 may include information that a port 132 has changed state from occupied to empty, or empty to occupied. The port module service 430 responds to this advertising message by transmitting a scan request to the port state sensor 134 to obtain the identity which port has changed and confirm the state change (i.e., from occupied to empty, or empty to occupied). The port state sensor 134 replies to the scan request with a scan response comprising the requested information. After sending the scan response, the port state sensor 134 may continue to transmit the advertising message for a predetermined duration to ensure that the scan response was properly received by the port state monitor 136. That is, if the port state monitor 136 receives a duplicate advertising message after successfully receiving the scan response, the port state monitor 136 may ignore those requests. However, if the port state monitor 136 did not successfully receive a scan response to its scan request, it will response to a duplicate advertising message in order to again attempt to receive the port state change information. If the port state sensor 134 transmits a scan response and the port state monitor 136 does not further respond to the duplicate advertising messages, then the port state sensor 134 may presume that the port state monitor 136 successfully received the port state change information via the scan response message.

Figure 7:
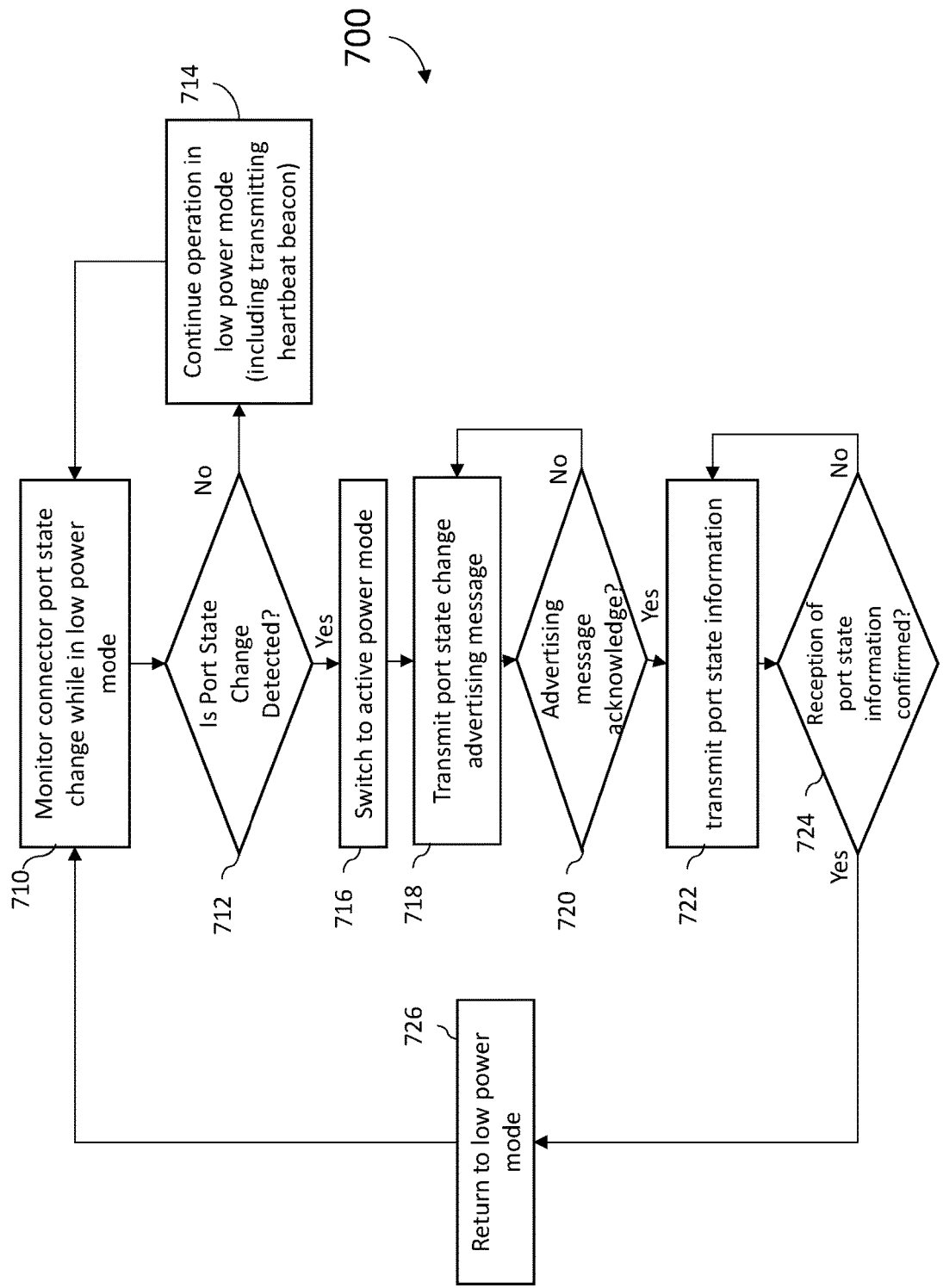
FIG. 7 is a diagram illustrating another method for one embodiment of the present disclosure.

FIG. 7 is a flowchart providing an example embodiment of a method 700 for providing port state monitoring for a network panel of an automated infrastructure management system. It should be understood that the features and elements described herein with respect to the method shown in FIG. 7 and the accompanying disclosure may be used in conjunction with, in combination with, or substituted for elements of any of the other embodiments discussed herein, and vice versa. Further, it should be understood that the functions, structures and other description of elements associated with embodiments of FIG. 7 may apply to like named or described elements for any of the Figures and vice versa.

The method begins at 710 where the sensor controller operates in low power mode and continuously monitors the status of the I/O port to detect when a change occurs in the port state (i.e. empty versus occupied) or any of the connector ports monitored by the port sensing circuit. As discussed above, while operating in the low power mode, in some embodiments the sensor controller may periodically transmit a heartbeat beacon that lets the port state monitor know that the sensor controller is in low power mode, but otherwise operable. When no port state change is detected, the sensor controller continues operating in low power mode (shown at 714) and continues monitoring at 710. When a port state change is detected, the method 700 proceeds to 716 where the sensor controller switches from low power mode to active power mode, and to 718 where it begins to transmit a port state change advertising message to the port state monitor. This port state change advertising message is repeatedly transmitted, more frequently than the heartbeat beacon was transmitted, to ensure that the port state monitor quickly obtains the new port state information. For example, an advertising message indicating a port state change may be transmitted on the order of once every 100 msec while the heartbeat beacon is transmitted on the order of once every 5 seconds. The method proceeds to 720 where the sensor controller receives an acknowledgement that the advertising message indicating a port state change was received by the port state monitor. This acknowledgement may come in the form of a request from the port state monitor to establish a connection, or through a scan request message or other acknowledgement received from the port state monitor. The port state information is communicated to the port state monitor at 722. In some embodiments, communication of the port state information is implemented by the port module service described above. When the sensor controller receives confirmation that the port state monitor has received the port state information, the method proceeds to 726 where the sensor controller returns to low power mode and resumes monitoring at 710. If confirmation is not received, the sensor controller may attempt to recommunicate the port state information to the port state monitor.

In some embodiments, over the air software updates to the modules 130 may be pushed from the Network 110. The sequence is initiated by pushing a software image from a software server, over the Network 110, and to the port state monitor 136. Once the port state monitor 136 has received the software image, it listens for the next advertising message from a module 130 and initiates a connection to the module 130 as described above. Once the connection is established, the new software version is downloaded to the module 130 after a successful download is confirmed, the port state monitor 136 disconnects from the module 130. The module 130, and in response to the disconnect event, restarts and boots up with the new image. The port state monitor 136 may then repeat this sequence until all modules on the network patching equipment 124 service by that port state monitor 136 are updated. In some embodiments, if for any reason, the software version for a module 130 is not known, the port state monitor 136 may initially query the module 130 for its current software version using the device information service 432. The new software version will likely be too big for one packet transmission, and so it will need to be segmented, with packet receipts acknowledged by module 130 with a final confirmation at the end, after and an overall cyclic redundancy check (CRC) is validated. Finally the software download is not necessarily sequential. That is, the port state monitor 136 may simultaneously establish multiple connections to one or more modules 130 on dedicated channels, and be in various stages of software download for each. This will provide for faster updates for modules 130 of patching equipment 124.

As mentioned above, in some embodiments, a single port state monitor 136 may operate across the multiple chassis 122 of a network equipment rack 120. That is, as opposed to each chassis 122 comprising its own dedicated port state monitor 136, the antenna 322 of a port state monitor 136 may instead be implemented as an antenna array or distributed antenna system having antenna elements routed within other chassis 122 in order to communicate with modules in such chassis 122 where no port state monitor 136 is installed.

Although in some embodiment each port state monitor 136 may directly communicate with the AIM System Manager 105 as discussed above, in other embodiments, information from multiple port state monitors 136 may be first be aggregated. For example, in one implementation, the AIM system 100 may also further comprise one or more controllers 116. In the exemplary embodiment shown in FIG. 1, the controller 116 is implemented as a unit that is separate from the patching equipment 124 such that one controller 116 is able to serve multiple items of patching equipment 124. It is to be understood, however, that other embodiments can be implemented in other ways. For example, one or more items of patching equipment 124 can have the controller 116 integrated within the patching equipment 124 so that the controller 116 is a part of at least one unit of the patching equipment 124 within a rack 120 instead of being separate therefrom. In the exemplary embodiment shown in FIG. 1, the controller 116 is configured to be connected to, and manage, patching equipment 124 having AIM functionality 104 that is installed in one or more racks 120 and is also referred here as a "rack controller 116."

In some such embodiments, each rack controller 116 may aggregate connection information for the ports 132 of the patching equipment 124 received from port state monitors 136 in the associated rack 120. More specifically, each rack controller 116 is configured to use the port state monitors 136 to monitor the state of each port 132 and identify connection or disconnection events occurring at that port 132 (for example, by detecting changes in the connection state of the port 132). In some embodiments, each rack controller 116 is configured to illuminate or otherwise actuate any visual indicators 332 associated with the port 132 and to monitor the state of each button 334 associated with that port 132 and identify any events occurring at such buttons 334 (for example, button press and/or release events).

Figure 8:
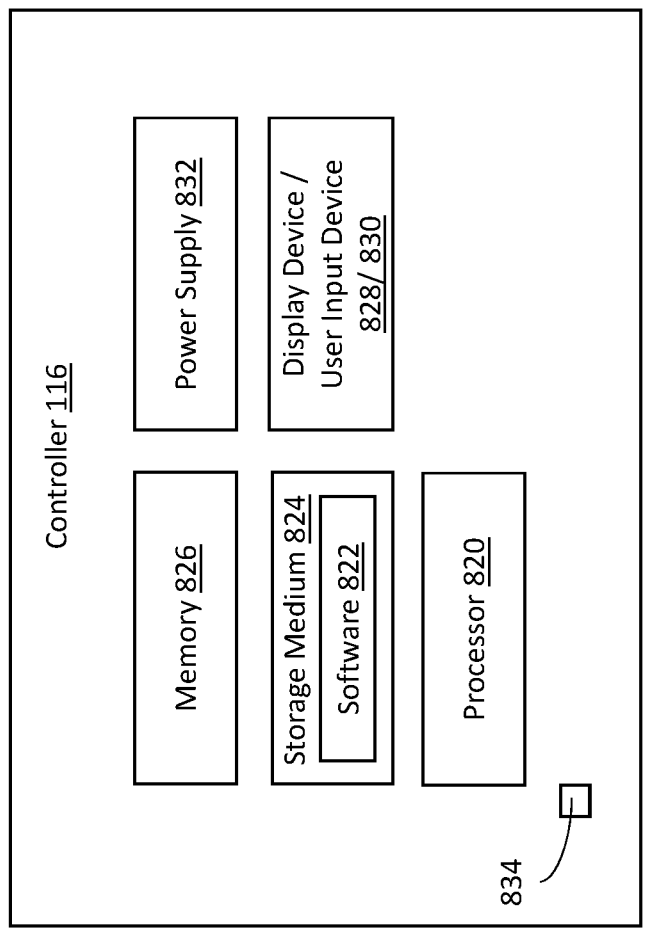
FIG. 8 is a diagram illustrating a rack controller for one embodiment of the present disclosure.

One exemplary embodiment of a rack controller 116 is shown in FIG. 8. In one aspect illustrated in FIG. 8, each rack controller 116 comprises at least one programmable processor 820 on which software or firmware 822 executes. The software 822 comprises program instructions that are stored (or otherwise embodied) on an appropriate non-transitory storage medium or media 824 from which at least a portion of the program instructions are read by the programmable processor 820 for execution thereby. The software 22 is configured to cause the processor 820 to carry out at least some of the operations described here as being performed by that controller 116. Although the storage medium 824 is shown in FIG. 8 as being included in the controller 116, it is to be understood that remote storage media (for example, storage media that is accessible over a network) and/or removable media can also be used. In one aspect illustrated in FIG. 8, each rack controller 116 also comprises memory 826 for storing the program instructions and any related data during execution of the software 822.

Each rack controller 116 also includes a display device 828 for displaying information for a user located at the associated rack 120 and a user-input device 830 for receiving user-input from such a user. In one aspect illustrated in FIG. 8, the display device 128 and the user-input device 130 are implemented together in a liquid crystal display (LCD) touch screen that is used for both displaying information and receiving user input. Each rack controller 116 includes a power supply 832 that is configured to provide power for rack controller 116 and/or the patching equipment 124 connected to the rack controller 116. In other embodiments, the power supply 832 is implemented separately from the controller 116. In this embodiment, each rack controller 116 comprises an external network interface 834 that can be used to directly connect that rack controller 116 to network 110 (shown in FIG. 1). In this exemplary embodiment, the network 110 is implemented as an ETHERNET LAN and, as a result, the external network interface 834 comprises an ETHERNET interface and is also referred to here as "ETHERNET interface" 834. As shown in FIG. 1, rack controller 116 may provide asset and connection information to the AIM system manager 105 based on port stat information obtained from the port state monitors 136 of patching equipment 124 that it manages.

EXAMPLE EMBODIMENTS

Example 1 includes a device comprising: at least one port module, the at least one port module comprising one or more connector ports each configured to receive a connector of a network data cable; and a port state sensor that includes a port sensing circuit coupled to a sensor controller, wherein the port sensing circuit is configured to sense a port state for the one or more connector ports; wherein the sensor controller is configured to input the port state from the port sensing circuit, wherein in response to detecting a change in the port state from the port sensing circuit, the sensor controller wirelessly transmits port state information to a port state monitor.

Example 2 includes the device of example 1, further comprising: a chassis; and the port state monitor; wherein the port state monitor, the port state sensor and the at least one port module are installed within the chassis.

Example 3 includes the device of any of examples 1-2, further comprising: a chassis; and the port state monitor; wherein the port state sensor and the at least one port module are installed within the chassis; wherein the port state monitor is located outside the chassis, and is coupled to at least one antenna element installed within the chassis.

Example 4 includes the device of any of examples 1-3, wherein the one or more connector ports comprise either fiber optic network data cable connector ports, electrical conductor network data cable connector ports, or hybrid network data cable connector ports.

Example 5 includes the device of any of examples 1-4, wherein the sensor controller wirelessly transmits port state information to the port state monitor using a Bluetooth Low Energy (BLE) protocol.

Example 6 includes the device of any of examples 1-5, wherein the port sensing circuit comprises a respective switch associated with each of the one or more connector ports, wherein the respective switch changes state in response to either an insertion of the connector into the one or more connector ports or a removal of the connector from the one or more connector ports.

Example 7 includes the device of any of examples 1-6, wherein the sensor controller comprises: a processor coupled to a memory; an I/O port, wherein the port sensing circuit is coupled to the sensor controller through the I/O port, and where the processor is configured to input the port state from the port sensing circuit; a wireless communication circuit coupled to the processor, wherein the sensor controller wirelessly transmits the port state information to the port state monitor using the wireless communication circuit.

Example 8 includes the device of example 7, wherein the wireless communication circuit is configured to wirelessly communicate using a Bluetooth Low Energy (BLE) protocol.

Example 9 includes the device of any of examples 7-8, wherein the sensor controller further comprises one or more profiles that define and implement services executed by the processor and are accessible to the port state monitor, wherein the one or more profiles include at least a Port Module Service comprising a plurality of data objects associated with the one or more connector ports of the at least one port module, wherein the plurality of data objects comprise at least at port state data object that stores the port state for the one or more connector ports as sensed by the port sensing circuit.

Example 10 includes the device of example 9, wherein the port state monitor determines whether the port state sensor has completed an initial configuration process based on whether the Port Module Service is activated.

Example 11 includes the device of example 9-10, wherein the plurality of data objects of the Port Module Service further comprise data objects that store data for one or more of: a module identifier, a module type, a slot number, a slot position, a number of ports, or a port type.

Example 12 includes the device of example 9-11, wherein the one or more profiles further includes a Bluetooth Low Energy (BLE) protocol defined Device Information Service (DIS) and Battery Service (BAS).

Example 13 includes the device of any of examples 7-12, wherein the processor is configured to switch operating modes between a lower power mode and an active power mode; wherein when the processor is operating in the low power mode, the wireless communication circuit transmits a heartbeat beacon to the sensor controller at a first periodicity; wherein when the processor senses a change in the port state from the port sensing circuit, the processor switches from the low power mode to the active power mode, wherein while in the active power mode, the processor: begins transmitting an advertising message the port state monitor indicating that a port state change has occurred; transmits the port state information to the port state monitor; and in response to confirming that the port state monitor has received the port state information, switches from the active power mode back to the active power mode.

Example 14 includes the device of example 13, wherein the heartbeat beacon comprises information about the current charge of a battery powering the port state sensor.

Example 15 includes the device of any of examples 1-14, wherein the port state monitor further comprises: a wireless communication circuit configured to receive the port state information from the sensor controller; a processor coupled to a memory and configured to input the port state information and store the port state information in the memory; a network interface circuit coupled to the processor, wherein the network interface circuit communicatively couples the port state monitor with a network; wherein, in response to receiving the port state information from the sensor controller, the processor forwards the port state information to an automated infrastructure management system via the network.

Example 16 includes the device of example 15, wherein the port state monitor comprise at least one interface or web service accessible from the network.

Example 17 includes the device of any of example 15-16, wherein the port state monitor further receives configuration information associated with the at least one port module from the port state monitor and stores the configuration information in the memory.

Example 18 includes a network port state monitoring system, the system comprising: a port state sensor that includes a port sensing circuit coupled to a sensor controller, wherein the port sensing circuit is configured to sense a port state for one or more connector ports of a device, the one or more connector ports each configured to receive a connector of a network data cable; a port state monitor, wherein the sensor controller is configured to input the port state from the port sensing circuit, wherein in response to detecting a change in the port state from the port sensing circuit, the sensor controller wirelessly transmits port state information to the port state monitor.

Example 19 includes the system of example 18, wherein the sensor controller wirelessly transmits port state information to the port state monitor using a Bluetooth Low Energy (BLE) protocol.

Example 20 includes the system of any of examples 18-19, wherein the sensor controller comprises: a processor coupled to a memory; an I/O port, wherein the port sensing circuit is coupled to the sensor controller through the I/O port, and where the processor is configured to input the port state from the port sensing circuit; a wireless communication circuit coupled to the processor, wherein the sensor controller wirelessly transmits the port state information to the port state monitor using the wireless communication circuit.

Example 21 includes the system of example 20, wherein the wireless communication circuit is configured to wirelessly communicate using a Bluetooth Low Energy (BLE) protocol.

Example 22 includes the system of any of examples 18-21, wherein the sensor controller further comprises one or more profiles that define and implement services executed by the processor and are accessible to the port state monitor, wherein the one or more profiles include at least a Port Module Service comprising a plurality of data objects associated with the one or more connector ports of the at least one port module, wherein the plurality of data objects comprise at least at port state data object that stores the port state for the one or more connector ports as sensed by the port sensing circuit.

Example 23 includes the system of example 22, wherein the port state monitor determines whether the port state sensor has completed an initial configuration process based on whether the Port Module Service is activated.

Example 24 includes the system of any of examples 22-23, wherein the plurality of data objects of the Port Module Service further comprise data objects that store data for one or more of: a module identifier, a module type, a slot number, a slot position, a number of ports, or a port type.

Example 25 includes the system of any of examples 22-24, wherein the one or more profiles further includes a Bluetooth Low Energy (BLE) protocol defined Device Information Service (DIS) and Battery Service (BAS).

Example 26 includes the system of any of examples 18-25, wherein the processor is configured to switch operating modes between a lower power mode and an active power mode; wherein when the processor is operating in the low power mode, the wireless communication circuit transmits a heartbeat beacon to the sensor controller at a first periodicity; wherein when the processor senses a change in the port state from the port sensing circuit, the processor switches from the low power mode to the active power mode, wherein while in the active power mode, the processor: begins transmitting an advertising message the port state monitor indicating that a port state change has occurred; transmits the port state information to the port state monitor; and in response to confirming that the port state monitor has received the port state information, switches from the active power mode back to the active power mode.

Example 27 includes the system of example 26, wherein the heartbeat beacon comprises information about the current charge of a battery powering the port state sensor.

Example 28 includes the system of any of examples 18-27, wherein the port state monitor further comprises: a wireless communication circuit configured to receive the port state information from the sensor controller; a processor coupled to a memory and configured to input the port state information and store the port state information in the memory; a network interface circuit coupled to the processor, wherein the network interface circuit communicatively couples the port state monitor with a network; wherein, in response to receiving the port state information from the sensor controller, the processor forwards the port state information to an automated infrastructure management system via the network.

Example 29 includes an automated infrastructure management (AIM) system, the system comprising: a plurality of devices, each comprising a respective one of the devices of any of examples 1-17; at least one server comprising the AIM System Manager, wherein AIM System Manager obtains port state information from the port state monitor of each of the plurality of devices and is in communication with each respective sensor controller of the plurality of devices through a network.

In various alternative embodiments, system and/or device elements, method steps, or example implementations described throughout this disclosure (such as any of the port modules, port state monitors, patching equipment and other devices, the AIM system manager, rack controllers, network and wireless communication circuits, port sensing circuits, sensor controllers or other controllers, interfaces, profiles or services, or sub-parts of any thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, terms such as "controller", "processor", "port", "port module", "sensor", "monitor", "circuit", each refer to non-generic device elements that would be recognized and understood by those of skill in the art and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A device, the device comprising:
  at least one port module, the at least one port module comprising one or more connector ports each configured to receive a connector of a network data cable; and
  a port state sensor that includes a port sensing circuit coupled to a sensor controller, wherein the port sensing circuit is configured to sense a port state for the one or more connector ports;
  wherein the sensor controller is configured to input the port state from the port sensing circuit, wherein in response to detecting a change in the port state from the port sensing circuit, the sensor controller wirelessly transmits port state information to a port state monitor; and
  wherein the sensor controller is configured to switch from a low power mode to an active power mode in response to detecting the change in the port state.

2. The device of claim 1, further comprising:
  a chassis; and
  the port state monitor;
  wherein the port state monitor, the port state sensor and the at least one port module are installed within the chassis.

3. The device of claim 1, further comprising:
  a chassis; and
  the port state monitor;
  wherein the port state sensor and the at least one port module are installed within the chassis;
  wherein the port state monitor is located outside the chassis, and is coupled to at least one antenna element installed within the chassis.

4. The device of claim 1, wherein the one or more connector ports comprise either fiber optic network data cable connector ports, electrical conductor network data cable connector ports, or hybrid network data cable connector ports.

5. The device of claim 1, wherein the sensor controller wirelessly transmits port state information to the port state monitor using a Bluetooth Low Energy (BLE) protocol.

6. The device of claim 1, wherein the port sensing circuit comprises a respective switch associated with each of the one or more connector ports, wherein the respective switch changes state in response to either an insertion of the connector into the one or more connector ports or a removal of the connector from the one or more connector ports.

7. The device of claim 1, wherein the sensor controller comprises:
  a processor coupled to a memory;
  an I/O port, wherein the port sensing circuit is coupled to the sensor controller through the I/O port, and where the processor is configured to input the port state from the port sensing circuit;
  a wireless communication circuit coupled to the processor, wherein the sensor controller wirelessly transmits the port state information to the port state monitor using the wireless communication circuit.

8. The device of claim 1, wherein the port state monitor further comprises:
  a wireless communication circuit configured to receive the port state information from the sensor controller;
  a processor coupled to a memory and configured to input the port state information and store the port state information in the memory;
  a network interface circuit coupled to the processor, wherein the network interface circuit communicatively couples the port state monitor with a network;
  wherein, in response to receiving the port state information from the sensor controller, the processor forwards the port state information to an automated infrastructure management system via the network.

9. The device of claim 7, wherein the wireless communication circuit is configured to wirelessly communicate using a Bluetooth Low Energy (BLE) protocol.

10. The device of claim 7, wherein the sensor controller further comprises one or more profiles that define and implement services executed by the processor and are accessible to the port state monitor, wherein the one or more profiles include at least a Port Module Service comprising a plurality of data objects associated with the one or more connector ports of the at least one port module, wherein the plurality of data objects comprise at least at port state data object that stores the port state for the one or more connector ports as sensed by the port sensing circuit.

11. The device of claim 7, wherein the processor is configured to switch operating modes between the low power mode and the active power mode;
wherein when the processor is operating in the low power mode, the wireless communication circuit transmits a heartbeat beacon to the sensor controller at a first periodicity;
wherein when the processor senses a change in the port state from the port sensing circuit, the processor switches from the low power mode to the active power mode, wherein while in the active power mode, the processor:
begins transmitting an advertising message the port state monitor indicating that a port state change has occurred;
transmits the port state information to the port state monitor; and
in response to confirming that the port state monitor has received the port state information, switches from the active power mode back to the active power mode.

12. The device of claim 8, wherein the port state monitor comprise at least one interface or web service accessible from the network.

13. The device of claim 8, wherein the port state monitor further receives configuration information associated with the at least one port module from the port state monitor and stores the configuration information in the memory.

14. The device of claim 10, wherein the port state monitor determines whether the port state sensor has completed an initial configuration process based on whether the Port Module Service is activated.

15. The device of claim 10, wherein the plurality of data objects of the Port Module Service further comprise data objects that store data for one or more of:
a module identifier, a module type, a slot number, a slot position, a number of ports, or a port type.

16. The device of claim 10, wherein the one or more profiles further includes a Bluetooth Low Energy (BLE) protocol defined Device Information Service (DIS) and Battery Service (BAS).

17. The device of claim 11, wherein the heartbeat beacon comprises information about the current charge of a battery powering the port state sensor.

18. A network port state monitoring system, the system comprising:
a port state sensor that includes a port sensing circuit coupled to a sensor controller, wherein the port sensing circuit is configured to sense a port state for one or more connector ports of a device, the one or more connector ports each configured to receive a connector of a network data cable;
a port state monitor, wherein the sensor controller is configured to input the port state from the port sensing circuit, wherein in response to detecting a change in the port state from the port sensing circuit, the sensor controller wirelessly transmits port state information to the port state monitor; and
wherein the sensor controller is configured to switch from a low power mode to an active power mode in response to detecting the change in the port state.

19. The system of claim 18, wherein the sensor controller wirelessly transmits port state information to the port state monitor using a Bluetooth Low Energy (BLE) protocol.

20. The system of claim 18, wherein the sensor controller comprises:
a processor coupled to a memory;
an I/O port, wherein the port sensing circuit is coupled to the sensor controller through the I/O port, and where the processor is configured to input the port state from the port sensing circuit;
a wireless communication circuit coupled to the processor, wherein the sensor controller wirelessly transmits the port state information to the port state monitor using the wireless communication circuit.

21. The system of claim 18, wherein the sensor controller further comprises one or more profiles that define and implement services executed by the processor and are accessible to the port state monitor, wherein the one or more profiles include at least a Port Module Service comprising a plurality of data objects associated with the one or more connector ports of the at least one port module, wherein the plurality of data objects comprise at least at port state data object that stores the port state for the one or more connector ports as sensed by the port sensing circuit.

22. The system of claim 18, wherein the processor is configured to switch operating modes between the low power mode and the active power mode;
wherein when the processor is operating in the low power mode, the wireless communication circuit transmits a heartbeat beacon to the sensor controller at a first periodicity;
wherein when the processor senses a change in the port state from the port sensing circuit, the processor switches from the low power mode to the active power mode, wherein while in the active power mode, the processor:
begins transmitting an advertising message the port state monitor indicating that a port state change has occurred;
transmits the port state information to the port state monitor; and
in response to confirming that the port state monitor has received the port state information, switches from the active power mode back to the active power mode.

23. The system of claim 18, wherein the port state monitor further comprises:
a wireless communication circuit configured to receive the port state information from the sensor controller;
a processor coupled to a memory and configured to input the port state information and store the port state information in the memory;
a network interface circuit coupled to the processor, wherein the network interface circuit communicatively couples the port state monitor with a network;
wherein, in response to receiving the port state information from the sensor controller, the processor forwards the port state information to an automated infrastructure management system via the network.

24. The system of claim 20, wherein the wireless communication circuit is configured to wirelessly communicate using a Bluetooth Low Energy (BLE) protocol.

25. The system of claim 21, wherein the port state monitor determines whether the port state sensor has completed an initial configuration process based on whether the Port Module Service is activated.

26. The system of claim 21, wherein the plurality of data objects of the Port Module Service further comprise data objects that store data for one or more of:
a module identifier, a module type, a slot number, a slot position, a number of ports, or a port type.

27. The system of claim 21, wherein the one or more profiles further includes a Bluetooth Low Energy (BLE) protocol defined Device Information Service (DIS) and Battery Service (BAS).

28. The system of claim 22, wherein the heartbeat beacon comprises information about the current charge of a battery powering the port state sensor.

* * * * *